C. W. MOORE.
PISTON RING.
APPLICATION FILED FEB. 12, 1919.

1,328,289. Patented Jan. 20, 1920.

INVENTOR:
Charles W. Moore.
BY
ATTORNEYS.

UNITED STATES PATENT OFFICE.

CHARLES W. MOORE, OF INDIANAPOLIS, INDIANA.

PISTON-RING.

1,328,289.

Specification of Letters Patent.

Patented Jan. 20, 1920.

Application filed February 12, 1919. Serial No. 276,456.

*To all whom it may concern:*

Be it known that I, CHARLES W. MOORE, a citizen of the United States, residing at Indianapolis, in the county of Marion, State of Indiana, have invented certain new and useful Improvements in Piston-Rings; and I do hereby declare the following to be a full, clear, and exact description of the invention, such as will enable others skilled in the art to which it appertains to make and use the same.

This invention relates to new and useful improvements in piston rings and particularly to piston rings used in connection with gas, air or steam engines.

One object of the present invention is to provide a novel and improved structure by means of which the leakage of gas past the piston is reduced to a minimum thereby increasing the efficiency of the engine and the increase of power derived therefrom.

Another object is to provide a two-part piston ring which is so fitted together that the parts will be held in proper position and leakage prevented.

Other objects and advantages will be apparent from the following description when taken in connection with the accompanying drawing.

Figure 1:
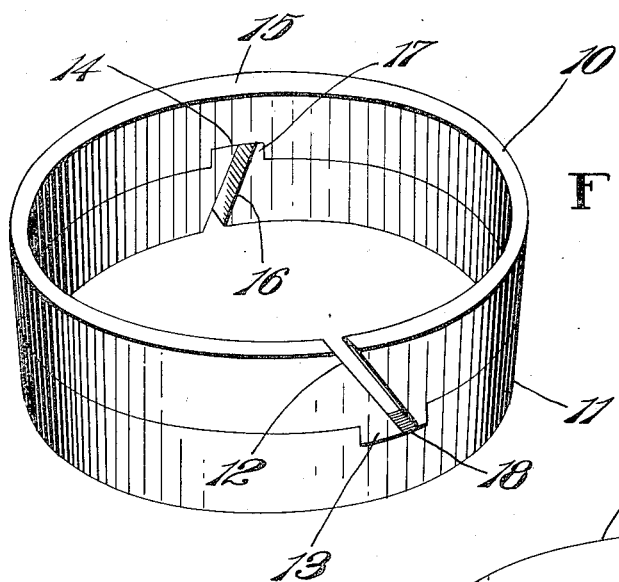
Figure 1 is a perspective view of the two-part piston ring.
Figure 2:
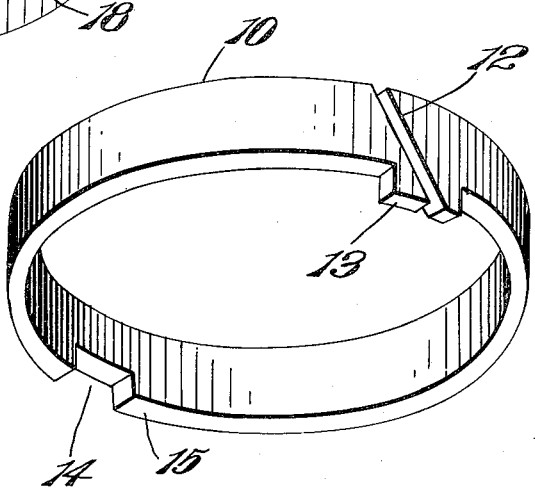
Fig. 2 is a perspective view of one of the sections.
Figure 3:
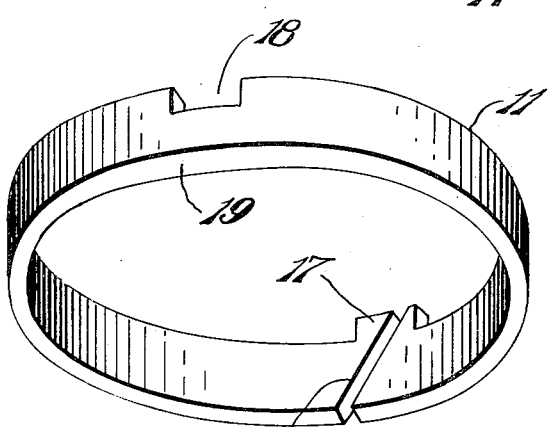
Fig. 3 is a perspective view of the other section.

Referring particularly to the accompanying drawing, 10 represents one section of the ring and 11 the other section. The section 10 is in the form of a flat band having an oblique cut 12 formed therethrough. On one edge of the ring, and being divided by said cut, is an angularly extending boss 13, the purpose of which will presently appear. In the same edge of the ring, but at a point diametrically opposite to the boss 13, is an angularly extending recess 14. It will also be noted that the side of the ring in which the recess is formed is thicker than the remaining portions of the ring, as shown at 15, to compensate for weakening of this part of the ring by its reduction when the recess is cut therein.

The section 11 is of similar outline to that of the section 10, and has in one portion the oblique cut 16 which divides the angularly extending lug 17. In the same edge from which the lug 17 projects is formed an angularly extending recess 18. This portion of the ring is thickened, as shown at 19, in the same manner and for the same purpose as ring 10.

When the rings are properly placed together, as shown in Fig. 1, the lug 13 is disposed within the recess 18, while the lug 17 is disposed in the recess 14. Thus the two ring sections are held against angular displacement with respect to each other, and the end of each cut opens into the recess of the other ring section and direct passage of gas through and from each cut is prevented.

It will furthermore be understood that by preventing correlative angular displacement of the ring sections, the cuts through sections may never aline with the well-known adverse effect.

What is claimed is:

1. A piston ring comprising a pair of annular members each having an angularly extending boss at one end edge and an angularly extending recess diametrically opposite thereto in the same edge, the members being disposed in end contact with the boss of each member in the recess of the other, each member having a cut from end to end opening through its boss.

2. A piston ring comprising a pair of annular members each having an angularly extending boss at one end edge and an angularly extending recess diametrically opposite thereto in the same edge, the recesses being of greater angular extent than the bosses, the members being disposed in end contact with the boss of each member in the recess of the other, each member having a cut from end to end opening through its boss.

In testimony whereof, I affix my signature in the presence of two witnesses.

CHARLES W. MOORE.

Witnesses:
 NEWELL W. WARD,
 HARVEY A. BRABILL.